US006974276B2

(12) United States Patent
Kirchner et al.

(10) Patent No.: US 6,974,276 B2
(45) Date of Patent: Dec. 13, 2005

(54) CONNECTING PART FOR MOUNTING RAILS

(75) Inventors: Georg Kirchner, Solingen (DE); Michael Binna, Bottrop (DE); Beate Görtz, Köln (DE); Andreas Hanke, Leichlingen (DE); Renate Neumann, Düsseldorf (DE)

(73) Assignee: Halfen GmbH & Co. KG, Langenfeld-Richrath (DE)

( * ) Notice: Subject to any disclaimer, the term of this patent is extended or adjusted under 35 U.S.C. 154(b) by 0 days.

(21) Appl. No.: 10/249,064

(22) Filed: Mar. 13, 2003

(65) Prior Publication Data

US 2004/0001739 A1    Jan. 1, 2004

Related U.S. Application Data

(63) Continuation of application No. PCT/EP01/09948, filed on Aug. 29, 2001, now abandoned.

(30) Foreign Application Priority Data

Sep. 13, 2000 (DE) ................. 100 45 539

(51) Int. Cl.[7] ............................ A45F 3/44; E04H 12/22
(52) U.S. Cl. ....................... 403/385; 403/174; 403/175; 403/316; 403/290; 403/344; 403/335; 403/373; 403/386; 52/656.1; 248/62; 211/182
(58) Field of Search ................ 403/174–176, 403/297, 339, 340, 213, 316, 289, 290, 344, 403/335, 336, 338, 373, 374.1, 374.2, 374.3, 403/385, 386; 52/656.1; 248/62; 211/182

(56) References Cited

U.S. PATENT DOCUMENTS

| 439,493 | A | * | 10/1890 | Eames ..................... 403/344 |
| 1,117,158 | A | * | 11/1914 | Bernartz ..................... 248/524 |
| 1,580,780 | A | * | 4/1926 | Dixon et al. ............... 403/344 |
| 2,765,087 | A | * | 10/1956 | Weinbaum ................... 211/182 |
| 3,606,028 | A | * | 9/1971 | Klein ......................... 211/191 |
| 3,747,268 | A | * | 7/1973 | Linder ......................... 47/39 |
| 3,756,327 | A | * | 9/1973 | Orthman ..................... 403/385 |
| 3,776,549 | A | * | 12/1973 | Ganis ......................... 403/312 |
| 4,047,823 | A | * | 9/1977 | Mydels ........................ 403/386 |

(Continued)

FOREIGN PATENT DOCUMENTS

DE             1 950 285         7/1970

(Continued)

*Primary Examiner*—Daniel P. Stodola
*Assistant Examiner*—Ernesto Garcia
(74) *Attorney, Agent, or Firm*—Gudrun E. Huckett (57) ABSTRACT

A connecting part for attachment on a mounting rail has a fastening part with an at least approximately rectangular cross-section. The fastening part has legs and surrounds when mounted a mounting rail on all sides by having a matching cross-section formed by the legs. The fastening part has clamping devices for effecting a clamping fixation of the connecting part on the mounting rail. A cross-sectional plane of the fastening part has two diagonally opposed corners and the clamping devices are arranged on the two diagonally opposed corners, respectively.

28 Claims, 9 Drawing Sheets

U.S. PATENT DOCUMENTS

| | | | |
|---|---|---|---|
| 4,053,246 A | * 10/1977 | Uccello | 403/316 |
| 4,786,204 A | * 11/1988 | Mayeda | 403/374.3 |
| 4,874,149 A | * 10/1989 | Miceli | 52/165 |
| 5,069,054 A | * 12/1991 | Hladky et al. | 403/344 |
| 5,131,784 A | * 7/1992 | Maasen | 403/312 |
| 5,503,493 A | * 4/1996 | Kato et al. | 403/312 |
| 5,588,336 A | * 12/1996 | Chou | 403/344 |
| 5,605,410 A | 2/1997 | Pantev | 403/176 |
| 6,039,298 A | * 3/2000 | Stier | 52/165 |
| 6,406,003 B1 | * 6/2002 | Shaw | 403/336 |
| 6,682,253 B2 | * 1/2004 | Binna et al. | 403/382 |

FOREIGN PATENT DOCUMENTS

| | | |
|---|---|---|
| DE | 85 29 057.2 | 1/1986 |
| FR | 2535361 A1 * | 5/1984 |

* cited by examiner

CONNECTING PART FOR MOUNTING RAILS

CROSS REFERENCE TO RELATED APPLICATIONS

This is a continuation of International Application PCT/EP01/09948 with an international filing date of Aug. 29, 2001, not published in English under PCT Article 21(2), and now abandoned.

BACKGROUND OF INVENTION

The invention relates to a connecting part for attachment onto a mounting rail.

Mounting rails are used in construction technology for multiple purposes. Such mounting rails, connected by suitable connecting parts with one another, enable the construction of frames or consoles with cantilevered arms on which, for example, installations such as pipes, conduits or the like can be fastened. With a suitable selection of different connecting parts, corresponding configurations can be mounted on site according to a modular principle, without this requiring pre-manufacture, for example, in a shop. Because of the easy and adjustable assembly, corresponding mounting rail systems are used frequently, for example, in pipeline construction and in any application where a continuous adjustment to the local conditions is required.

In known mounting rail systems, the mounting rails have a rail slot on one side in which hammerhead screws or correspondingly shaped nuts can be secured. The screw connections which can be formed in this way support a plurality of different angle elements for connecting attachment parts, transverse supports or the like. When the mounting rails are configured with a rail slot and perforated sidewalls and back walls or two rail slots (front side and back side) and perforated sidewalls, corresponding mounting angle elements can be attached to all four sides of the mounting rail.

The necessary positive-locking attachment that is adjustable across the entire length of the rail is possible only at the sides provided with the rail slots. The perforations reduce significantly the bearing capacity of the mounting rail, and an attachment on the perforated sides is possible only to a greatly limited extent. A positive-locking connection in the case of slotted holes is also not provided; in the case of a positive-connection with round holes, adjustability cannot be realized.

For a plurality of attachment tasks, for example, several supports to be connected at different angles and in different combinations relative to one another, providing a corresponding number of connecting parts adapted to the corresponding task, respectively, is required. This results in correspondingly high manufacturing and storage costs. Mounting on site is made difficult, in particular, when adjustment work is required in areas that are difficult to access: in certain situations, the exchange of several different connecting parts may even be required.

The attachment of fastening elements in the area of the rail slot can generate great local stresses in the case of corresponding loading. Corresponding angle elements must be designed to have a corresponding large size for providing excellent force introduction. When mounting two oppositely positioned connecting elements, in the case of mounting rails of smaller cross-sections, interference of the space for the holding screws may occur so that, as a result of this, the positioning possibilities of the connecting elements is limited.

SUMMARY OF INVENTION

It is an object of the invention to provide a connecting part with an increased field of application.

The object is solved according to the invention by a connecting part comprising a fastening part having an at least approximately rectangular cross-section which, in the mounted state, surrounds the mounting rail on all sides with a matching cross-section and which comprises at least one clamping device for a clamping fixation of the connecting part on the mounting rail, which, relative to the cross-sectional plane of the fastening part, are arranged in the area of two diagonally opposed corners.

In this connection, it is proposed to arrange the two clamping devices on the connecting part in the area of two diagonally opposed corners relative to its cross-sectional plane. With this arrangement, the resulting clamping force acts substantially diagonally relative to the rectangular cross-section as a result of which all four sides of the fastening part are pressed against the four sides of the mounting rail, respectively. In this way, high securing forces result already for relatively minimal clamping forces so that the clamping devices can be constructed to be relatively small. Moreover, because of the diagonal arrangement of the clamping devices, four lateral parts of the connecting part are available on which, without being limited by the clamping devices, attachment parts such as transverse supports or the like can be secured. In particular in connection with a square cross-section of the fastening part in connection with a corresponding square cross-section of the mounting rail, this arrangement provides a variety of different positioning possibilities in which one and the same connecting part can be positioned as desired relative to the mounting rail, without having to consider geometric limitations. In this way, difficult adjustment work during assembly is simplified while avoiding too many different connecting parts.

For achieving minimal manufacturing costs, on the one hand, and for providing easy mounting with simple tools, the clamping devices are configured as a pair of opposed brackets that can be tightened relative to one another. The brackets have clamping screw holes through which the clamping screws can be inserted and subsequently tightened. For a simple manipulation, the corners of the brackets are cut off. The brackets of a clamping device, respectively, are expediently oriented, at least in approximation, in the direction of the diagonally oppositely positioned clamping device so that the brackets themselves, and also the clamping screw secured therein, are secured outside of the fastening area for the transverse supports or the like.

In an advantageous configuration the fastening element is divided into two separate fastening shells; each one is comprised of two legs which are positioned at a right angle to one another. The partition plane between the two fastening shells extends through the two oppositely positioned clamping devices. With this configuration, it is possible in a simple way to combine fastening shells of different configuration with one another so that with a few basic elements a large number of different combination possibilities is provided.

The two fastening shells can be loose individual parts. Depending on the application, it can be expedient that two fastening shells of a fastening part are welded with their end faces onto a baseplate. In this way, a profile rail can be easily inserted in the axial direction between the fastening shells and can secured on the baseplate by tightening the clamping device. For a high alignment precision of the component to be secured, the fastening shells in the area of their welded end faces are spaced apart such that the profile rail or the like to be secured in this area is received approximately free of play or with minimal clamping action. In connection with a precisely carried-out welding attachment of the fastening shells, a high angular alignment precision of the component to be connected relative to the baseplate is enabled. For a simple assembly, the fastening shells in the area of their free end faces in the untightened state have a greater spacing to one another than in the area of the welded end faces. The opening surrounded by the fastening shells has thus a slightly truncated cone or truncated pyramid shape so that the component to be attached can be simply inserted in a funnel-like fashion in the axial direction. By tightening the clamping devices in the area of the free end faces, the fastening shells also rest against the component to be secured in this area so that, on the one hand, high clamping forces and, on the other end, a high alignment precision are provided.

In an expedient embodiment, the baseplate is formed by a leg of an additional fastening shell. In this way, a universal component is provided with which two or more profile rails can be secured relative to one another at an angle, particularly at a right angle. Such a fastening shell with additional fastening shells welded thereto can be combined with an identical component for an angular connection of three profile rails. Possible is also a combination with a simple fastening shell so that a T-shaped connection of two profile rails results. It can also be expedient to secure by welding a pair of fastening shells on a leg of a single fastening shell, respectively. In this way, spatial corner connections are possible.

In an advantageous further configuration, the baseplate is formed by a wall of a mounting rail, a profile rail, or a transverse support. For a geometrically pre-defined position of the fastening part relative to the rail, the fastening part can be prepared by being welded to the rail so that the later mounting expenditure for securing an additional rail is reduced to tightening the camping device. The baseplate can also be a platform that can be screwed so that the rail elements can be secured in a simple way and with high angular precision on floor surfaces, walls, other shelf components or the like. In this connection, it is expedient for the baseplate to have slotted holes which serve for a better adjustment, in particular, relative to the support flange width or in the case of attachment by means of anchors. Slotted holes with parallel and/or orthogonal orientation can be provided. The clamping devices have advantageously at least two clamping screw holes spaced apart from one another so that, by positive-locking action transverse to the profile axis and non-positive connection in the longitudinal direction of the rail, correspondingly high securing forces can be obtained. In an expedient variant, a fastening shell has a plurality of clamping screw holes distributed in its longitudinal direction so that an additional fastening shell can be clamped at different stepped distances on the first fastening shell. In particular in connection with a configuration of the clamping screw holes as slotted holes, a simple position adjustment along the longitudinal axis of the fastening part or the mounting rail is enabled. The fastening shell is expediently rotationally symmetrical relative to a symmetry axis wherein the axis of symmetry is perpendicular to the partition plane of the fastening shells. With such a symmetrical configuration, a corresponding fastening part can not only be positioned as desired about the longitudinal axis of the mounting rail; a single fastening shell can also be secured in two positions rotated by 180 degrees relative to one another on the respective opposed fastening shell so that, in particular, the variety of the positioning possibilities of securing means for transverse supports or the like is broadened.

For increasing the securing force, at least one bore is provided in the legs and, preferably, both legs have two symmetrically arranged bores through which the fastening screws can be inserted. With these fastening screws, an intimate connection with the mounting rail can be achieved wherein advantageously the fastening screw can be continuously adjusted and secured positive-lockingly in a rail slot of the mounting rail. For a further increase of the securing force, it may be expedient to machine the inner side of the fastening parts so as to increase friction by providing teeth, grooves or the like.

As a result of the adjustability of the components even after assembly, pre-mounting of complete frame configurations is possible because the pre-mounted components can be adjusted on site to the site conditions. Pre-mounted connecting parts, without being demounted into individual half shells, can be slipped onto a free end of a mounting rail and can be secured after adjustment by means of the clamping screws, the fastening screws, or a combination thereof.

On a fastening part according to the invention, a plurality of different securing means can be provided alternatively or in combination. In a preferred configuration, the securing means is a support receptacle for a transverse support extending transversely to the longitudinal axis of the fastening part. The transverse support can also be a mounting rail preferably of the same kind as the mounting rail enclosed by the fastening part. In an expedient variant, the support receptacle for the transverse support can be formed by a pair of fastening shells which are welded to an additional fastening shell. In this way, a transverse support can be quickly mounted with a high securing force as well as high angle precision while requiring a minimal alignment expenditure.

Depending on the application, it can be expedient to configure the support receptacle with an approximately U-shaped or a closed hollow cross-section matching the cross-section of the transverse support. By means of the U-shaped cross-section easy assembly is made possible in that the transverse support can be inserted in the direction of its longitudinal axis as well as transverse thereto through the open side of the U. The configuration of the support receptacle with a closed hollow cross-section results in a very high bearing capacity with respect to receiving spatial forces and moments, for example, bending and torsion, so that the correspondingly configured connecting parts are suitable particularly for configurations receiving great loads, such as consoles or the like with cantilevered support arms.

The aforementioned support receptacles have expediently at least one bore for inserting a fastening screw with which the corresponding transverse support is secured. The corresponding bores and fastening screws are advantageously of the same kind as for securing the fastening parts on the mounting rail so that with a minimal number of different basic components a high variability in regard to the connecting possibilities is obtained. The support receptacles, in particular, when configured to have a closed hollow cross-section, have expediently a viewport through which the proper positioning of the inserted transverse support and the proper seat of the rearward fastening screw can be monitored. In an advantageous variant, the support receptacle is a pin onto which a transverse support with a hollow cross-section can be slipped and secured, for example, by means of a screw.

A universal attachment possibility for attachment parts of different kinds results from the configuration of the securing means as a fastening rail whose rail axis is substantially parallel to the longitudinal axis of the fastening part. Along the rail a simple positioning adjustment of the attachment part to be secured can be provided without having to detach the connecting part itself. The fastening rail has expediently a cross-section comparable to the rail slot of the mounting rails so that in this way the same type of fastening screws can be used. For high load requirements or for bridging a great adjustment range, it may be expedient to provide two fastening parts which are connected by a fastening rail with one another.

A great variety of attachment and combination possibilities results from providing connecting parts having securing means on two legs positioned at a right angle to one another, respectively. In combination with fastening shells comprising securing means only on one leg, or even without securing means, any desired connection of transverse supports—at an angle, T-shaped, or cross-shaped—can be realized.

The connecting parts according to the invention can be produced inexpensively because the configuration enables great tolerances and, in spite of this, the required positive-locking connection is achieved. Moreover, the fastening part can be produced of shaped sheet metal on which, depending on the type of application, securing means can be fastened by welding, riveting or the like. The shaping of the connecting parts enables proper corrosion protection, for example, by hot galvanizing.

DETAILED DESCRIPTION

Figure 1:
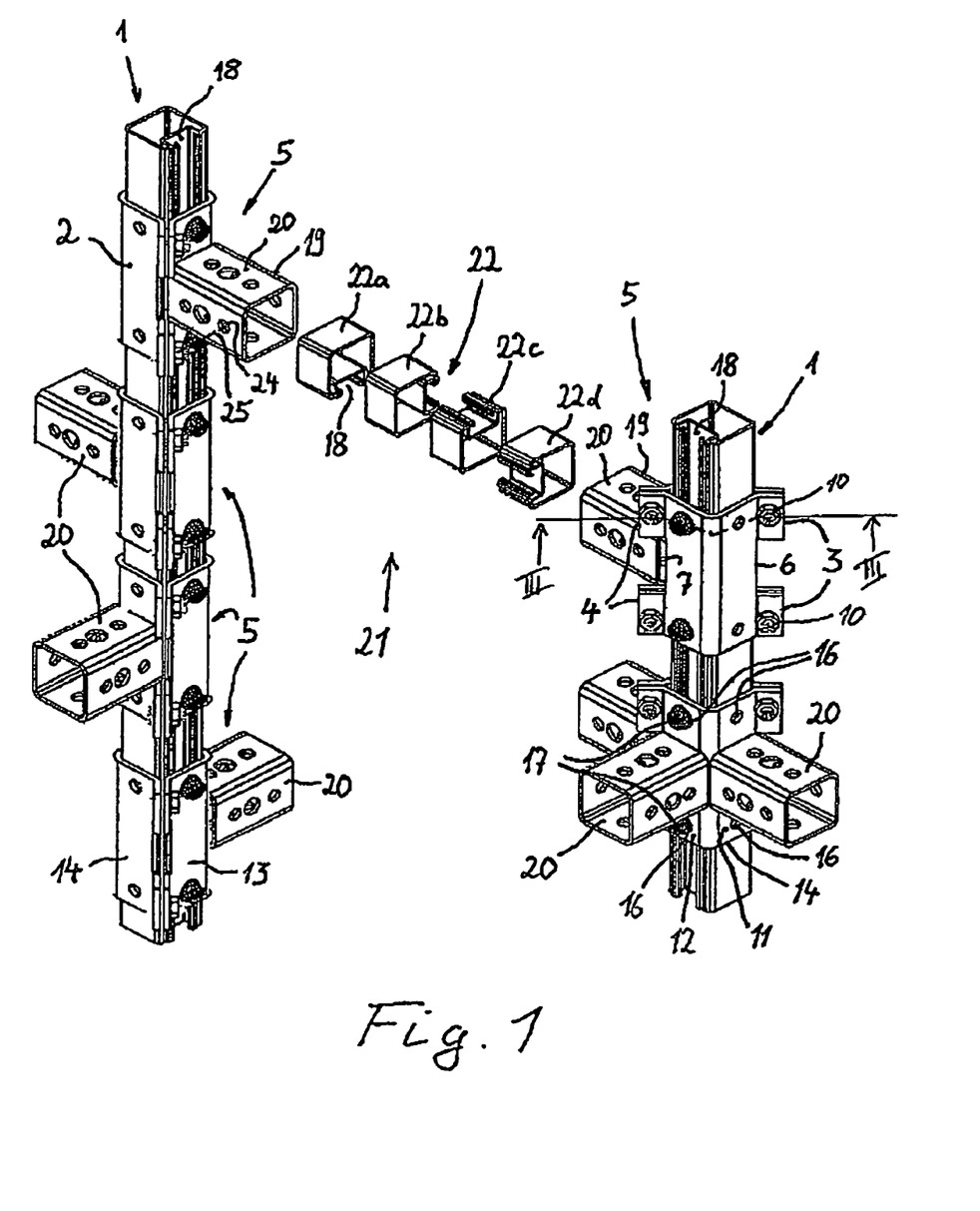
FIG. 1 shows in an exploded view a mounting rail system with its essential components.

FIG. 1 shows in a perspective illustration showing a schematic exploded view a frame construction of two vertical mounting rails 1 between which a transverse support 21 is horizontally positioned. The transverse support 21 is secured by a connecting part 5 on the two mounting rails 1, respectively. The connecting parts 5 securing the transverse support 21 are comprised of fastening parts 2 surrounding the mounting rail 1 on all sides and comprising securing means 19 in the form of a support receptacle 20 for the transverse support 21. The support receptacles 20 have a plurality of bores 24 for the indicated fastening screws 25. The transverse support 21 is formed as a mounting rail 22 of the same kind as the mounting rail 1 and comprises a rail slot 18. The mounting rail 22 can be mounted in different relative orientations relative to the support receptacle 20, illustrated by four segments 22a, 22b, 22c, 22d of the mounting rail 22 showing the different positions of the rail slot 18. Depending on the position of the rail slot 18 of the mounting rail 22, the fastening screws 25 are inserted through corresponding bores 24 and are secured positive-lockingly in the rail slot 18.

The fastening parts 2 have clamping devices 3, 4 which, with respect to the cross-sectional plane of the fastening part 2, are arranged in the area of two diagonally oppositely located corners 6, 7. The clamping devices 3, 4 are clamped by two spaced-apart clamping screws 10, respectively. The fastening parts 2 are divided into two separate fastening shells 13, 14 each comprising two legs 11, 12 positioned at a right angle to one another. Each one of the legs 11, 12 has two bores 16, respectively, for fastening screws 17. The bores 16 are arranged symmetrically to one another. This provides a plurality of different relative positioning possibilities of the illustrated connecting parts 5 relative to the mounting rail 1 or relative to the transverse support 21. In the right part of FIG. 1, a fastening shell 14 is illustrated having arranged on both legs 11, 12 a support receptacle 20, respectively. It is secured by means of two fastening screws 17 positive-lockingly in the rail slot 18 of the mounting rail 1. The fastening screws 17 are preferably embodied in the way described in the German patent application DE 297 14 621 U1.

In the left part of FIG. 1, connecting parts 5 are illustrated where only one support receptacle 20 is provided on a fastening shell 13 and where a further connecting shell 14 has no securing means 19 at all. The illustrated connecting parts 5 are illustrated in different relative positions to the rail slot 18 on the mounting rail 1.

Figure 2:
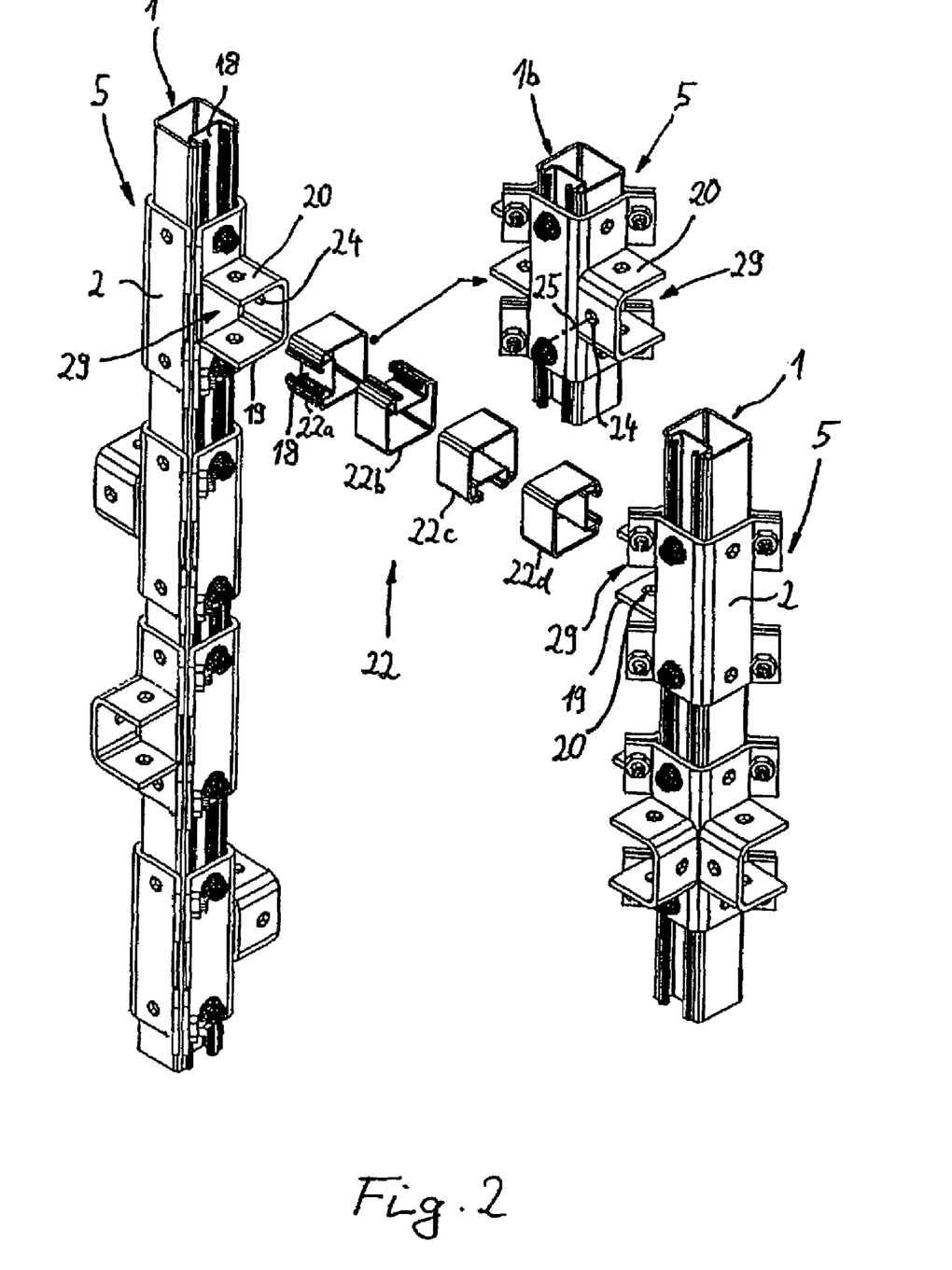
FIG. 2 shows the system according to FIG. 1 showing a variant of the connecting parts.

FIG. 2 shows a mounting rail system in which securing means 19 in the form of support receptacles 20 with a U-shaped cross-section are secured on the fastening parts 2 of the connecting parts 5. Comparable to FIG. 1, the mounting rail 22 is shown in four segments 22a, 22b, 22c, 22d with different orientation of the rail slots 18, respectively. On the two vertical mounting rails 1 the fastening parts 2 are secured such that two open sides 29 of the two support receptacles 20 point in the same direction. In the illustrated arrangement, the mounting rail 22 can be secured with its rail slot 18 by means of the bores 24 in the positions 22b, 22c, and 22d. In the case of an orientation of the mounting rail 22 with its rail slot 18 in the position 22a, the connecting part 5 can be aligned and secured as illustrated in the case of the mounting rail 1b. The rail slot 18 adjoins one of the bores 24 in the support receptacle 20 and can be secured by a corresponding fastening screw 25.

Figure 3:
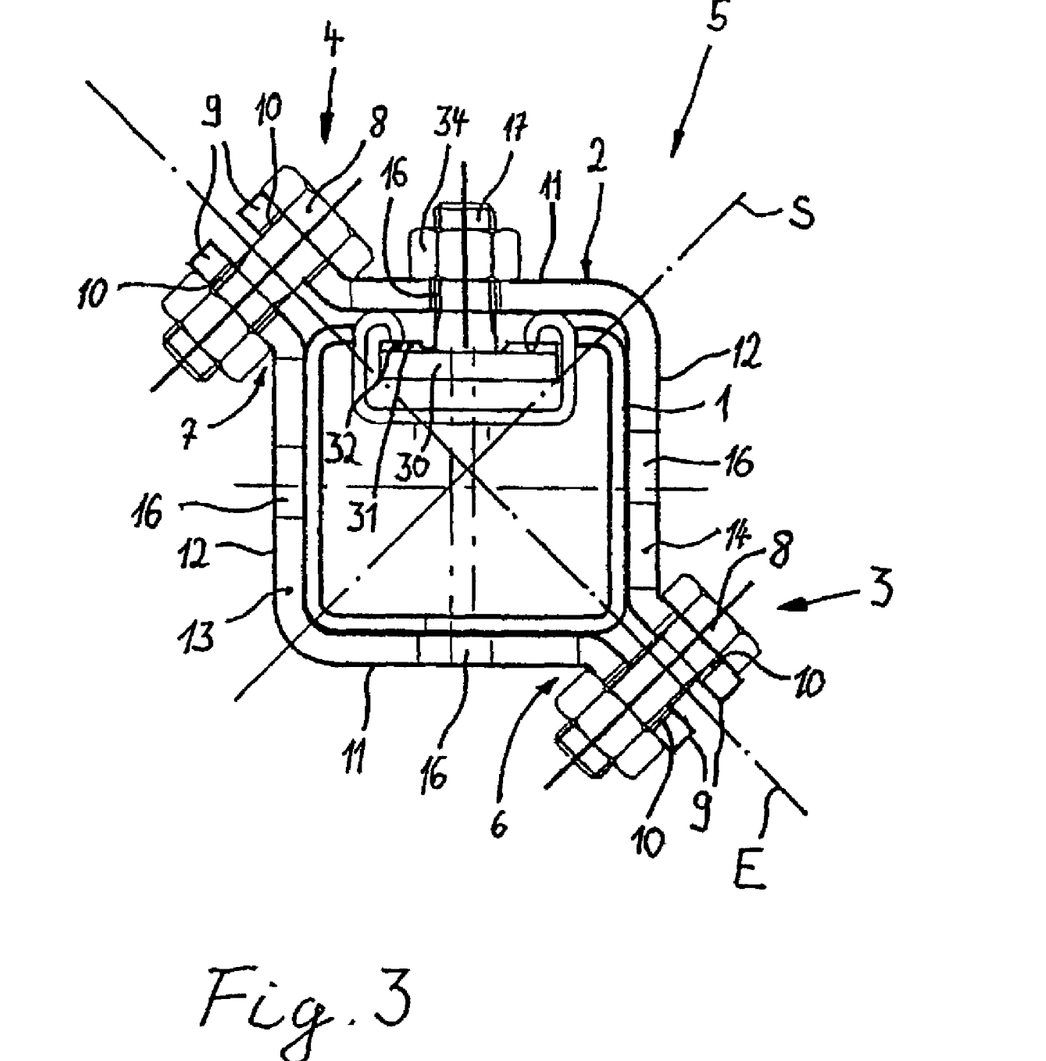
FIG. 3 is a cross-sectional illustration of a mounting rail with a connecting part surrounding it.

FIG. 3 shows a cross-section of a mounting rail 1 with a substantially square cross-section which has a rail slot 18 at one side. The connecting part 5 has a fastening part 2 also having a substantially square cross-section and surrounding the mounting rail 1 on all sides. The fastening part 2 is divided into two separate fastening shells 13, 14 which have legs 11, 12 positioned at a right angle to one another. Brackets 9 adjoining the legs 11, 12 have clamping screw holes 10 and clamping screws 8 inserted therein, forming clamping devices 3, 4 for a clamping fixation of the connecting part 5 on the mounting rail 1. One half of the clamping screw holes 10 can also be configured as threaded bores, for example, in an alternating arrangement, into which bores the clamping screws 8 can be directly threaded. The two clamping devices 3, 4 are arranged in the illustrated cross-sectional plane of the fastening part 2 in the area of the two diagonally opposed corners 6, 7. A partition plane E extends through the two clamping devices 3, 4, and the separately formed fastening shells 13, 14 are positioned on both sides thereof. The neighboring brackets 9 are spaced from one another as a result of which, by tightening the clamping screws 8, the two fastening shells 13, 14 are secured by a clamping action on the mounting rail 1. By means of the gap between the tightenable brackets 9 a tolerance compensation is ensured when tightening the two clamping screws 8.

The two fastening shells 13, 14 are substantially rotationally symmetrical to a symmetry axis S which extends perpendicularly to the partition plane E. The two legs 11, 12 of the two fastening shells 13, 14 have at least one bore 16. Through the bore 16 adjoining the rail slot 18 a fastening screw 17 is inserted with which the connecting part 5 can be secured positive-lockingly on the mounting rail 1. For this purpose, the fastening screw 17 has a head 30 for positive-lockingly engaging the rail slot 18, wherein the head 30 is positioned in the rail slot 18 and provided with a toothing 31 which engages behind a toothed edge 32 of the rail slot 18. The fastening screw 17 is tightened by a nut 34. By means of the substantially square cross-section of the mounting rail 1 and of the fastening part 2, a relative fixation of the connecting part 5 on the mounting rail 1 rotated by 90 degrees, 180 degrees, or 270 degrees relative to the illustrated position is possible also. In this connection, one of the bores 16 is positioned in the area of the rail slot 18, respectively, so that a fixation with a fastening screw is possible. The brackets 9 of the two clamping devices 3, 4 are oriented in the direction of the diagonally opposed clamping devices 4, 3, respectively, so that the clamping screws 8 and the fastening screws 17 are spaced apart from one another.

Figure 4:
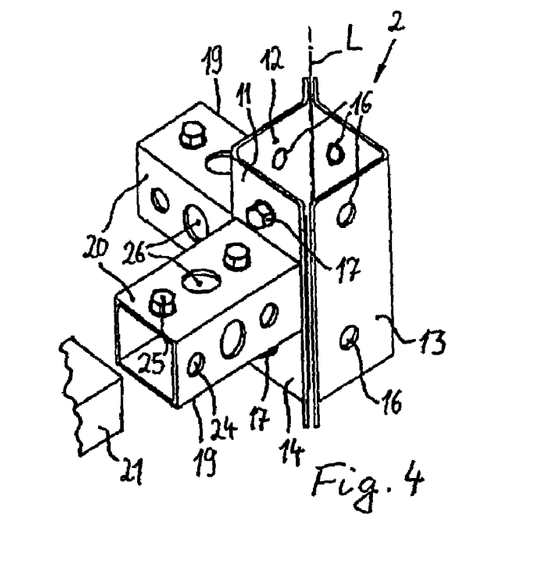
FIG. 4 is a perspective illustration of a connecting part with a support receptacle having a hollow cross-section.

FIG. 4 shows in a perspective illustration two fastening shells 13, 14 resting against one another. On the two legs 11, 12 of the fastening shell securing means 19 in the form of a support receptacle 20 with a closed, approximately square cross-section are provided, respectively. The two support receptacles 20 are provided for receiving a transverse support 21 positioned transversely to the longitudinal axis L of the fastening part 2 and have for this purpose a series of bores 24, for fastening screws 25, as well as viewports 29. The fastening shell 13 has no securing means 19 at all. In addition to the afore described or subsequently described securing means 19 in the form of support receptacles 20, fastening rails 28 etc., other types of securing means 19 such as hooks, eyes or the like can be provided for any suitable attachment part. Bores 16, symmetrically arranged to one another, for receiving the fastening screws 17 described above are provided in the upper and lower leg area of the two legs 11, 12 of the two fastening shells 13, 14. By means of the fastening shells 13, 14, having a symmetrical configuration as described above, and the symmetrical arrangement of the bores 16, any desired exchange of the fastening shells 13, 14 as well as mounting of the shells rotated relative to one another are possible.

Figure 5:
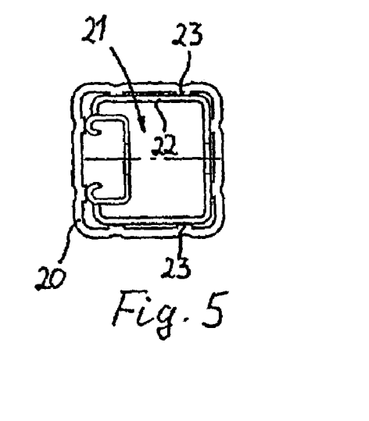
FIG. 5 shows a cross-sectional illustration of the support receptacle according to FIG. 4 with a transverse support arranged therein.

FIG. 5 shows a cross-section of a support receptacle 20 according to FIG. 4 with a substantially square, closed cross-section. In the support receptacle 20 a transverse support 21 in the form of a mounting rail 22 having also a substantially square cross-section is secured in that contact noses 23 at the inner side of the support receptacle 20 support the transverse support 21. The mounting rail 22 corresponds in regard to its properties to the mounting rail 1 illustrated in FIGS. 1 and 2 but can also be provided with any other suitable cross-section.

Figure 6:
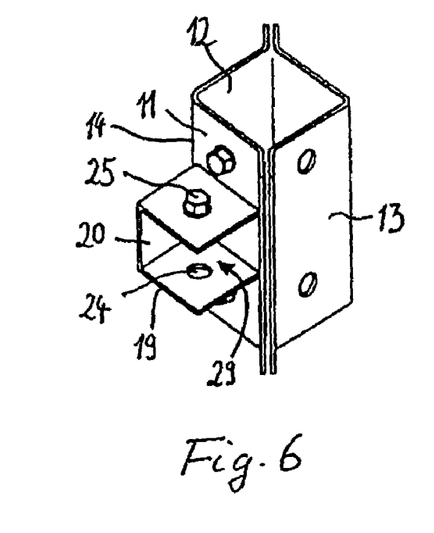
FIG. 6 is a variant of the connecting part of FIG. 4 with a U-shaped support receptacle.
Figure 7:
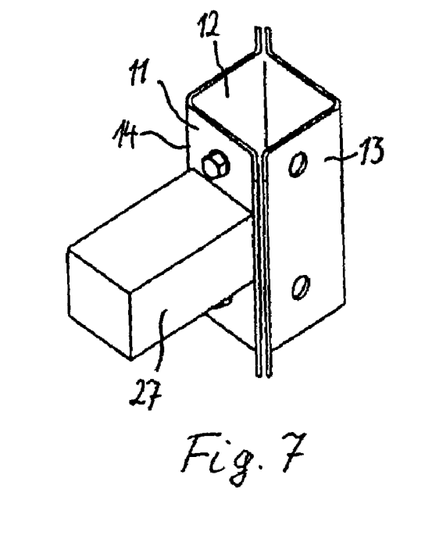
FIG. 7 is a further variant of the connecting part with a pin for slipping on a hollow cross-section.

FIG. 6 shows a variant of the securing means 19 in the form of a support receptacle 20 which has an approximately U-shaped cross-section with an open side 29 and bores 24 for fastening screws 25. In the variant according to FIG. 7 the securing means 19 are in the form of pins 27 onto which a transverse support 21 having a hollow cross-section can be pushed.

Figure 8:
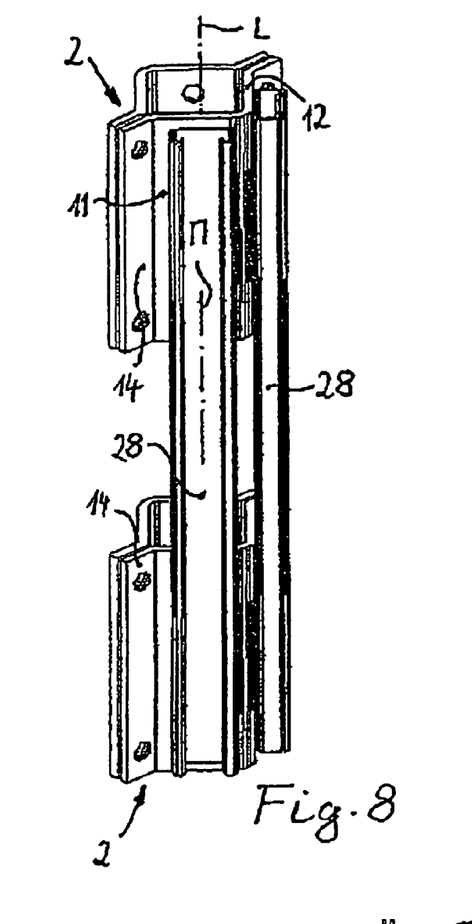
FIG. 8 is a schematic illustration of two fastening parts connected with one another by a fastening rail.

FIG. 8 shows an arrangement of two fastening parts 2 which are connected with one another by means of two fastening rails 28 connected to the two legs 11, 12 of a fastening shell 14, respectively. The rail axis A of the fastening rail 28 is positioned substantially parallel to the longitudinal axis L of the two fastening parts 2. The holding means 19, as illustrated, can be provided on both legs 11, 12 or only on one of the two legs 11, 12.

Figure 9:
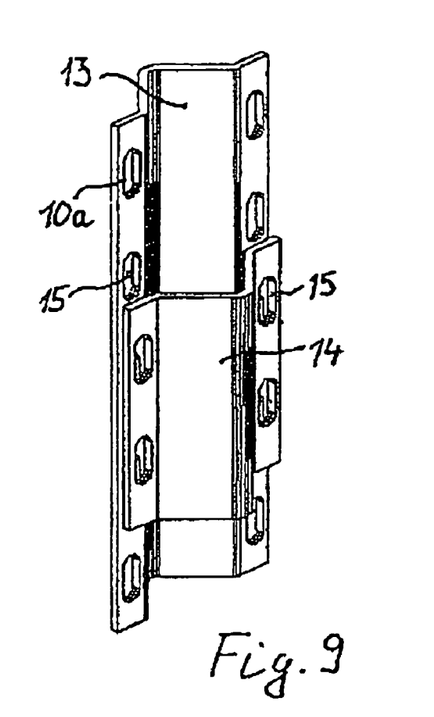
FIG. 9 shows in a basic illustration different fastening shells with a variety of slotted holes.

FIG. 9 shows two fastening shells 13, 14 in which the clamping screw holes 10a are configured as slotted holes 15. On the fastening shell 13 a plurality of the clamping screw holes 10a in the form of these slotted holes 15 are provided so that a height adjustable securing of the fastening shell 14 is made possible.

Figure 10:
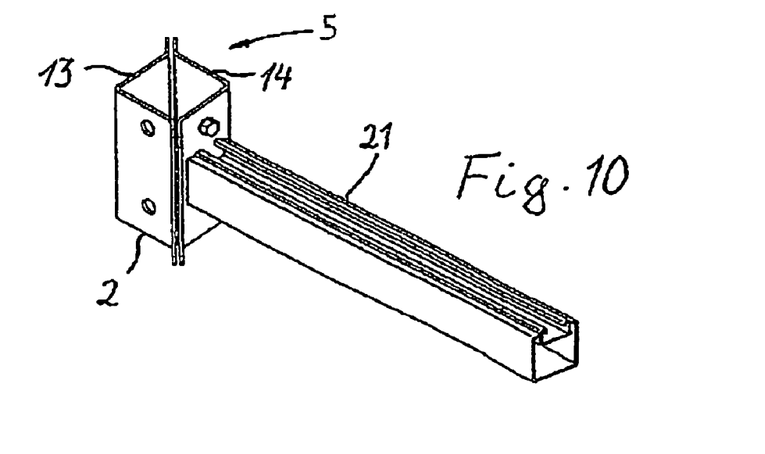
FIG. 10 shows in a perspective illustration a variant of the connecting part with a transverse support welded thereto.

Yet another fastening possibility is illustrated in FIG. 10 where the transverse support 21 is welded onto a fastening shell 14. The previously illustrated fastening parts 2 can be manufactured by way of a cutting process or a casting process and are comprised in the illustrated embodiment of stamped and folded sheet metal.

Figure 11:
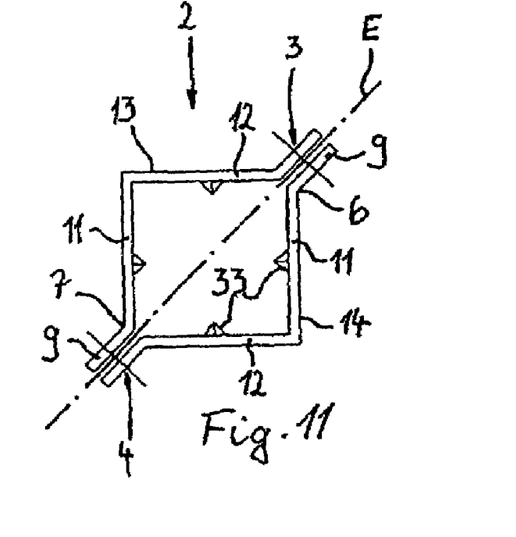
FIG. 11 is a basic illustration of a fastening part with diagonally aligned clamping brackets.
Figure 12:
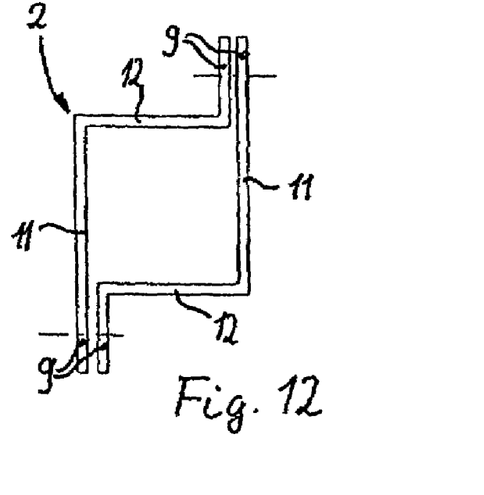
FIG. 12 shows a variant of the configuration according to FIG. 11 with clamping brackets arranged parallel to a lateral surface.
Figure 13:
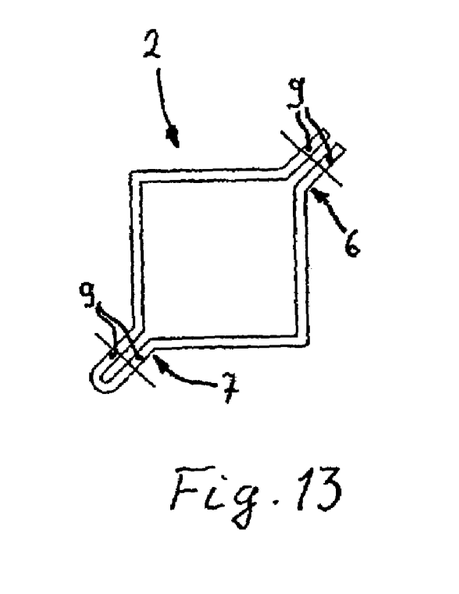
FIG. 13 is a basic illustration of a unitary configuration of the fastening part.
Figure 14:
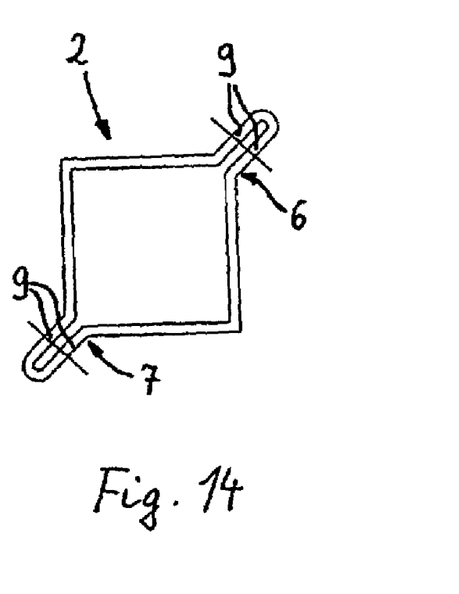
FIG. 14 shows a variant of the arrangement of FIG. 13 with a closed hollow cross-section.

FIG. 11 shows in a basic transverse cross-section the basic shape of the fastening part 2 having a clamping device 3, 4 on two opposed corners 6, 7, respectively. Embodiments can be expedient where instead of one of the clamping devices 3, 4 a jointed connection of the fastening shells 13, 14, for example, by hooks engaging one another, can be provided. The fastening part 2 is divided by a partition plane extending through the clamping devices 3, 4 into two fastening shells 13, 14 with two legs 11, 12 positioned at a right angle to one another. The structure on the inner side of the fastening shells 13, 14 can enable an additional increase of the coefficient of friction. Alternatively, a number of teeth 33 can provide a positive-looking connection with a mounting rail 1. It is also possible to provide grooves or noses comparable to the contact noses 23 of FIG. 5. The brackets 9 of the clamping devices 3, 4 are oriented in the direction of the diagonally opposed clamping devices 4, 3. The alternative illustrated in FIG. 12 has legs 9 parallel to the respective legs 11. FIG. 13 shows an additional variant in which the fastening part 2 is a unitary part formed by folding so that the two brackets 9 are connected with one another in the area of the corner 7. In another variant according to FIG. 14 the fastening part 2 is in the form of a closed pipe cross-section in which the brackets 9 of both corners 6, 7 adjoining one another, respectively, are connected with one another.

Figure 15:
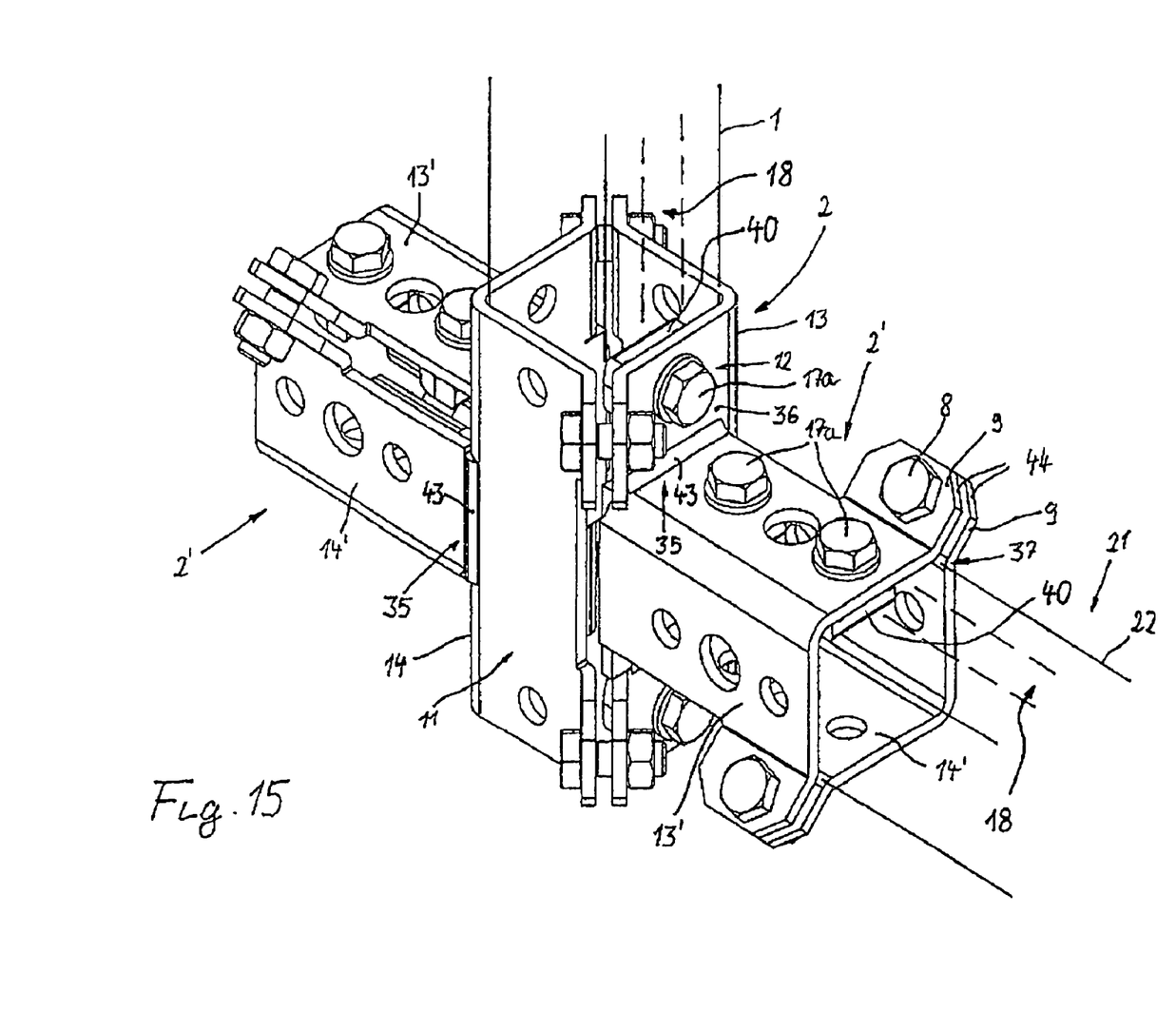
FIG. 15 is a perspective illustration of two fastening parts welded onto a fastening shell, respectively.

FIG. 15 shows a fastening part 2 which has two rotationally symmetrical fastening shells 13, 14 comparable to the embodiment of FIG. 3. One leg 12 of the two fastening shells 13, 14, respectively, forms a baseplate 36 onto which two additional fastening shells 13', 14' of a fastening part 2' can be welded with its end faces 35 by means of welding seams 43. On the other legs 11 corresponding fastening parts 2' can be connected by welding. On the free end faces 37 opposite the welded end faces 35, brackets 9 with clamping screws 8 are provided via which the fastening shells 13', 14' can be tightened relative to one another. All brackets 9 have cut-off corners 44.

The fastening part 2 is secured by clamping on an indicated mounting rail 1 comparable to FIG. 1. An additional securing action against axial sliding is provided in the form of fastening screws 17a. In the fastening parts 2' transverse supports 21 are indicated which are in the form of profile rails 22 and secured by clamping; they are secured axially by fastening screws 17a. Instead of the profile rails 22, a mounting rail 1 or any other suitable profile section, square pipe or the like can be provided. For a precise angular alignment of the profile rail 22 relative to the baseplate 36, the fastening shells 13', 14' are spaced in the area of the welded end faces 35 such that they receive the profile rails 22 in this area approximately without play or with a slight clamping action. In the area of the free end faces 37 the fastening shells 13', 14' in the not yet tightened state have a greater spacing relative to one another than in the area of the welded end faces 35. By tightening the clamping screws 8 the fastening shells 13', 14' rest areally on the profile rail 22 so that an is angularly precise, clamping-type fixation of the profile rail 22 is provided. In the illustrated embodiment, a right angle between the mounting rail 1 and the profile rail 22 is provided; however, any other suitable angle can be provided also.

Figure 16:
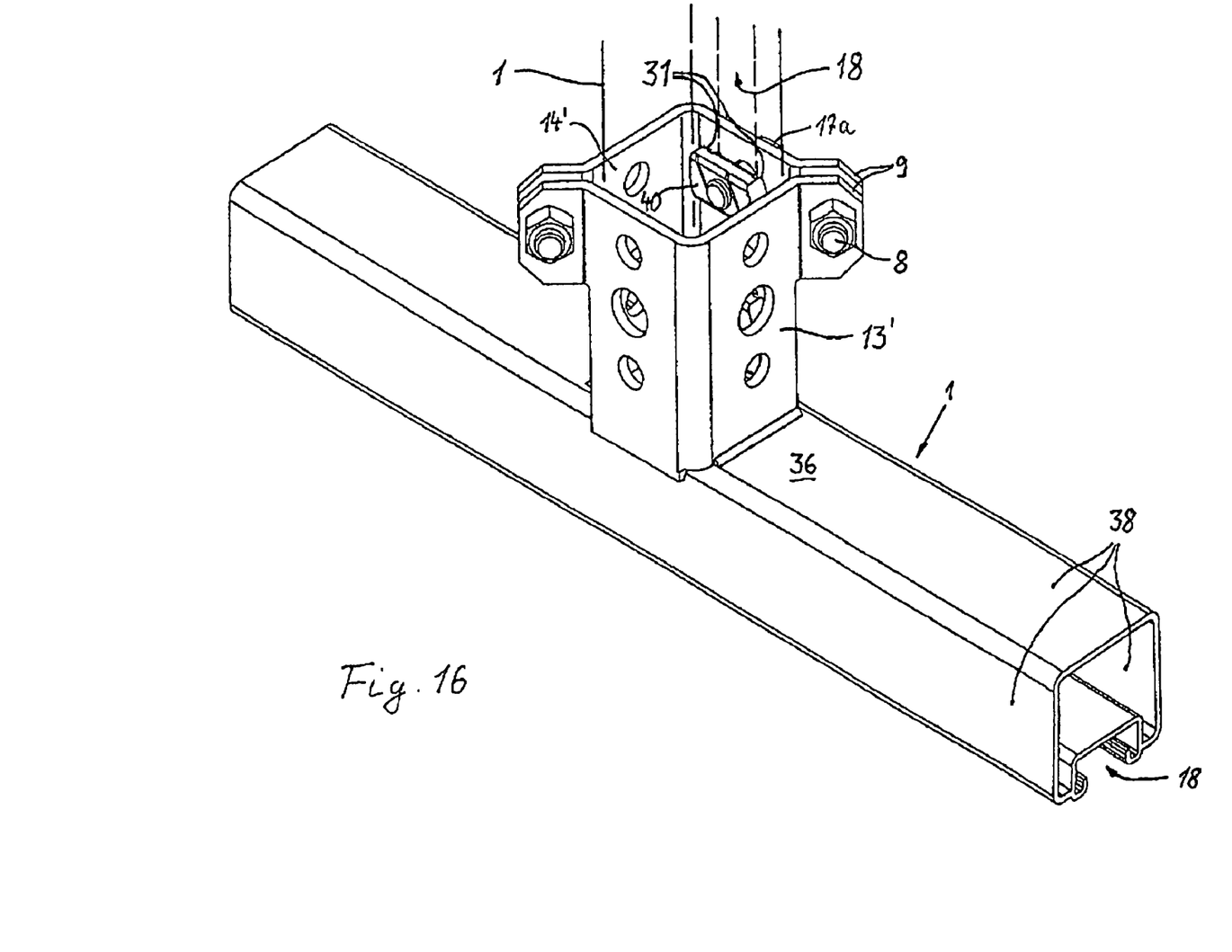
FIG. 16 is a perspective view of a pair of fastening shells welded onto a mounting rail.

FIG. 16 shows a variant in which the baseplate 36 is formed by a wall 38 of a mounting rail 1. In the illustrated embodiment the wall 38 is positioned opposite the rail slot 18; however, another wall 38 can also be provided. On the baseplate 36 the fastening shells 13', 14' are secured by welding; they match with regard to their other features and reference numerals the embodiment of FIG. 15. The fastening screw 17a inserted from the exterior engages a sliding block 40, configured to have a toothing 31 and comparable to the head 30 of the screw 17 according to FIG. 3, so that a mounting rail 1 or a profile rail 22 can be axially secured in a way comparable to the embodiments of FIGS. 3 and 15 by the combination of the screw 17a and the sliding block 40 used in place of the screw 17 with head 30 of FIG. 3, wherein the sliding block 40 positive-lockingly engages the rail slot 18.

Figure 17:
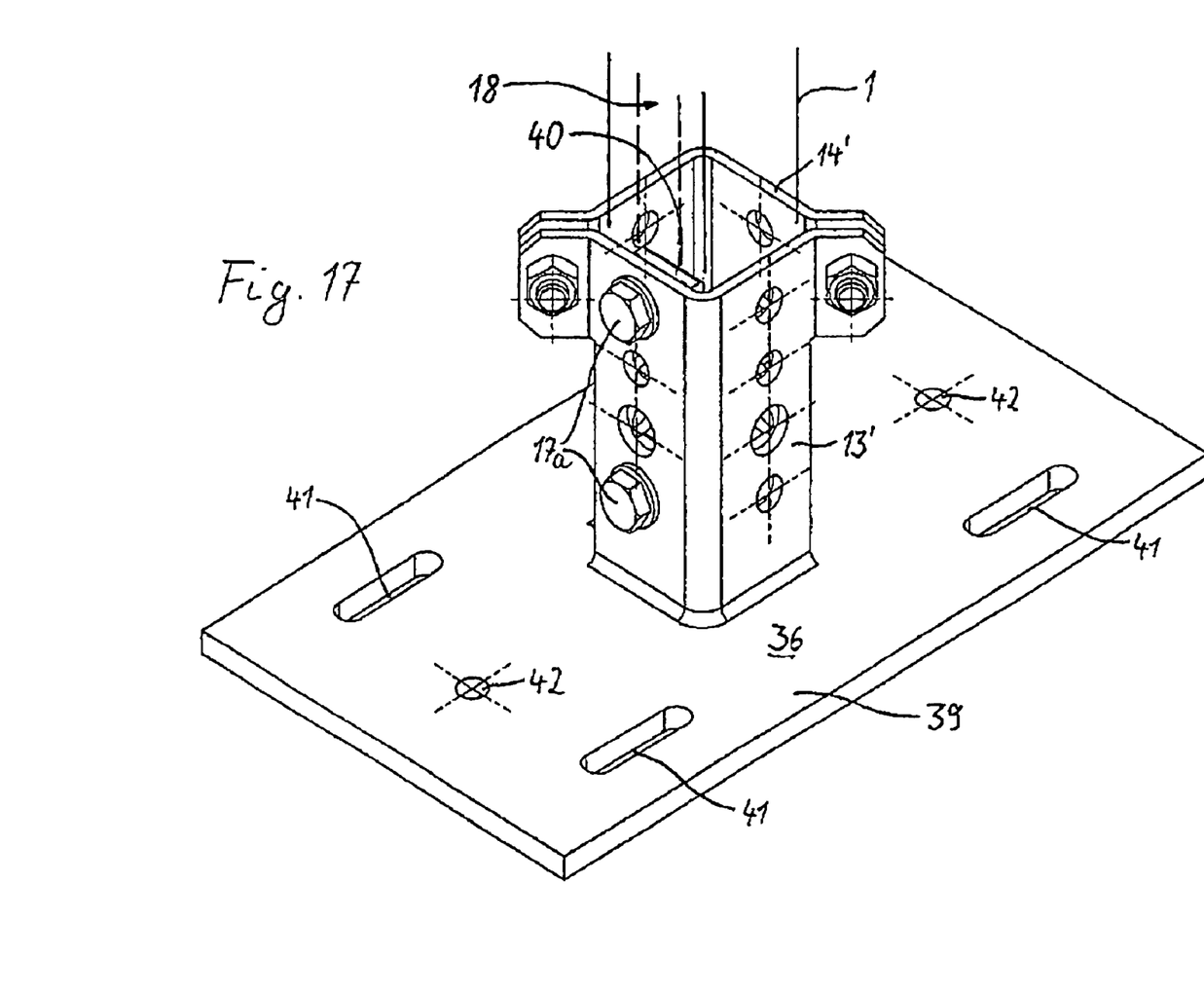
FIG. 17 shows a variant of the arrangement of FIG. 16 with fastening shells welded onto a platform.

In the embodiment according to FIG. 17 the baseplate 36 is formed by a platform 39; fastening shells 13', 14' are connected by welding to the platform at a right angle to the plane of the platform. The other features and reference numerals match the fastening shells 13', 14' of the embodiments of FIGS. 15 and 16. The platform 39 has a number of slotted holes 41 for providing an adjustable connection and round holes 42 by means of which it can be connected by screwing to a floor surface, a wall, additional shelf components or the like.

What is claimed is:

1. A mounting rail and a connecting part for attachment on the mounting rail, the connecting part comprising:
   a fastening part having an at least approximately rectangular cross-section and comprising legs, wherein the fastening part in a mounted state on the mounting rail surrounds the mounting rail on all sides of the mounting rail in that the fastening part has a cross-section formed by the legs matching a cross-section of the mounting rail;
   the fastening part having clamping devices for effecting a clamping fixation of the connecting part on the mounting rail, wherein a cross-sectional plane of the fastening part has two diagonally opposed corners and wherein the clamping devices are arranged on the two diagonally opposed corners, respectively;
   wherein the legs have at least one bore and at least one fastening screw inserted into the at least one bore, respectively, wherein the at least one fastening screw has means for positive-lockingly engaging an external longitudinally extending rail slot of the mounting rail, allowing securing of the fastening part at any location of the mounting rail.

2. The connecting part according to claim 1, wherein the legs have two of the bores arranged symmetrically, respectively.

3. The connecting part according to claim 1, wherein the fastening part has an at least approximately square cross-section.

4. The connecting part according to claim 1, wherein the clamping devices comprise two brackets and a clamping screw, respectively, wherein the brackets have clamping screw holes and are tightened relative to one another by the clamping screw extending through the clamping screw holes.

5. The connecting part according to claim 4, wherein the brackets of the clamping devices are oriented at least approximately in a direction of the diagonally opposed corners.

6. The connecting part according to claim 4, wherein the brackets have cut-off corners.

7. The connecting part according to claim 1, wherein the fastening part is divided into two separate fastening shells having two of the legs positioned at a right angle to one another, respectively, wherein a partition plane between the two fastening shells extends through the clamping devices.

8. A mounting rail and a connecting part for attachment on the mounting rail, the connecting part comprising:
   a fastening part having an at least approximately rectangular cross-section and comprising legs, wherein the fastening part in a mounted state on the mounting rail surrounds the mounting rail on all sides of the mounting rail in that the fastening part has a cross-section formed by the legs matching a cross-section of the mounting rail;
   the fastening part having clamping devices for effecting a clamping fixation of the connecting part on the mounting rail, wherein a cross-sectional plane of the fastening part has two diagonally opposed corners and wherein the clamping devices are arranged on the two diagonally opposed corners, respectively;
   wherein the legs have at least one bore and at least one fastening screw inserted into the at least one bore, respectively, and adapted to engage the mounting rail;

wherein the fastening part is divided into two separate fastening shells having two of the legs positioned at a right angle to one another, respectively, wherein a partition plane between the two fastening shells extends through the clamping devices; and a baseplate, wherein the two fastening shells of the fastening part have first end faces welded to the baseplate.

9. The connecting part according to claim 8, wherein the first end faces are spaced from one another such that an approximate play-free reception or a clamping reception of the mounting rail or of a profile rail is provided.

10. The connecting part according to claim 9, wherein the fastening shells have free second end faces opposite the first end faces, wherein in the initial state before tightening of the fastening part the second end faces have a greater spacing relative to one another than the first end faces.

11. The connecting part according to claim 8, wherein the baseplate is formed by a leg of an additional fastening shell.

12. The connecting part according to claim 8, wherein the baseplate is another wall of a mounting rail, a wall of a profile rail, or a wall of a transverse support.

13. The connecting part according to claim 8, wherein the baseplate is a platform attachable by screwing.

14. The connecting part according to claim 4, wherein the clamping devices have at least two clamping screw holes spaced apart from one another.

15. The connecting part according to claim 14, wherein the fastening part is divided into two separate fastening shells having two of the legs positioned at a right angle to one another, respectively, wherein the fastening shells have several of the clamping screw holes distributed in a longitudinal direction of the fastening shells.

16. The connecting part according to claim 15, wherein a partition plane between the two fastening shells extends through the clamping devices, wherein the fastening shells are substantially rotationally symmetrical to a symmetry axis positioned perpendicularly to the partition plane.

17. The connecting part according to claim 1, wherein the fastening part has at least one securing means for attaching additional elements.

18. The connecting part according to claim 17, wherein the securing means is a support receptacle adapted to receive a transverse support to be positioned transversely to a longitudinal axis of the fastening part.

19. The connecting part according to claim 18, wherein the support receptacle is adapted to receive a transverse support that is configured to be a mounting rail.

20. The connecting part according to claim 18, wherein the support receptacle for the transverse support is secured to the fastening part.

21. The connecting part according to claim 20, wherein the support receptacle has an inner side provided with contact noses configured to support the transverse support.

22. The connecting part according to claim 18, wherein the support receptacle has at least one bore adapted to receive a fastening screw for securing the transverse support.

23. The connecting part according to claim 18, wherein the support receptacle has a pin configured to receive a transverse support having a hollow cross-section.

24. The connecting part according to claim 17, wherein the securing means comprises at least one fastening rail having a rail axis positioned substantially parallel to a longitudinal axis of the fastening part.

25. The connecting part according to claim 17, wherein two of the fastening parts are adapted to be connected to one another by a fastening rail.

26. The connecting part according to claim 1, wherein the fastening part is made of shaped sheet metal.

27. The connecting part according to claim 1, wherein an inner side of the fastening part is machined to increase a coefficient of friction or is provided with elements for increasing friction by positive-locking action.

28. The connecting part according to claim 1, wherein the fastening part is divided into two separate fastening shells having two of the legs positioned at a right angle to one another, respectively, wherein a partition plane between the two fastening shells extends through the clamping devices, wherein the fastening shells are substantially rotationally symmetrical to a symmetry axis positioned perpendicularly to the partition plane.

* * * * *